United States Patent
Hung et al.

(10) Patent No.: US 6,188,568 B1
(45) Date of Patent: Feb. 13, 2001

(54) DISPLAY PANEL FOR A PORTABLE COMPUTER

(75) Inventors: Sung-Chen Hung; Ji-Liang Jeng; Ming-Hsun Chou, all of Taipei (TW)

(73) Assignee: Compal Electronics, Inc. (TW)

(*) Notice: Under 35 U.S.C. 154(b), the term of this patent shall be extended for 0 days.

(21) Appl. No.: 09/301,156

(22) Filed: Apr. 28, 1999

(51) Int. Cl.$^7$ .................................................. G06F 1/16

(52) U.S. Cl. .................... 361/681; 361/682; 345/905; 312/223.1

(58) Field of Search .................................... 361/681, 682; 248/917; 345/169, 905; 312/223.1–223.6; 349/51

(56) References Cited

U.S. PATENT DOCUMENTS

| | | | |
|---|---|---|---|
| 5,568,357 | * 10/1996 | Kochis et al. | 361/681 |
| 5,926,237 | * 7/1999 | Yun et al. | 361/681 |
| 6,020,942 | * 2/2000 | Yun et al. | 349/58 |

* cited by examiner

*Primary Examiner*—Leo P. Picard
*Assistant Examiner*—Hung Van Duong
(74) *Attorney, Agent, or Firm*—Pillsbury Madison & Sutro, LLP

(57) ABSTRACT

A display panel for a portable computer includes an LCD device, a cover and a frame joined together to receive the LCD device, a plurality of first screws fastening together the cover and the frame, and a plurality of second screws fastening the LCD device to the cover. The cover has a plurality of first screw holes disposed adjacent to a first rear end wall to receive the first screws. Each of opposite first side end walls has a recessed outer face formed with a plurality of second screw holes for receiving the second screws. The second screw holes open at and extend inwardly from the recessed outer face. The frame has a plurality of third screw holes disposed adjacent to a second rear end wall and aligned with the first screw holes to receive the first screws. Each of opposite second side end walls has a flap member projecting into the recessed outer face of a corresponding one of the first side end walls to cover the second screws. A plurality of clasp loops project from one of first and second front end walls of the cover and the frame to the other one of the first and second front end walls. A plurality of latches project inwardly and rearwardly from the other one of the first and second front end walls, and are inserted into the clasp loops.

3 Claims, 6 Drawing Sheets

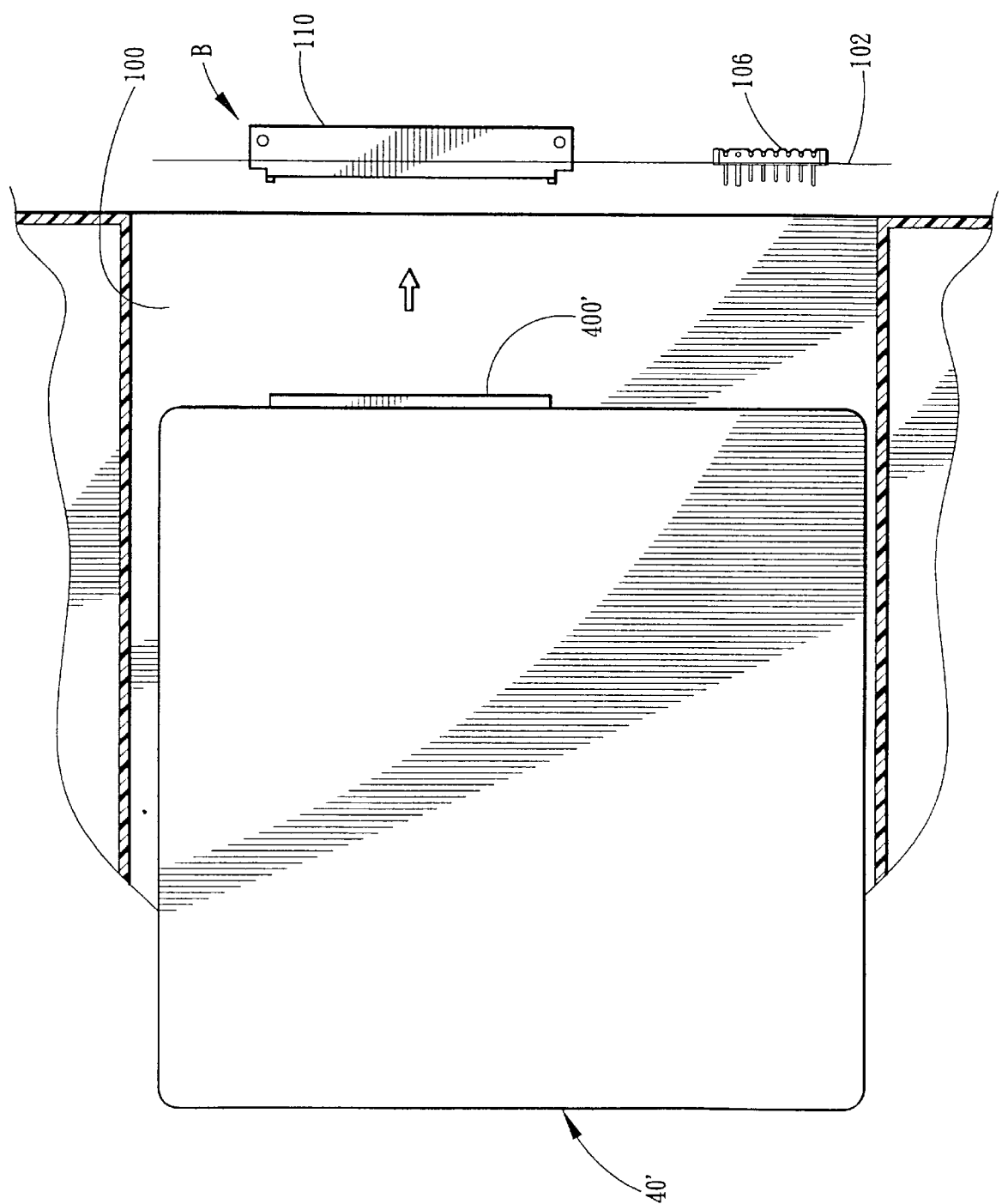

DISPLAY PANEL FOR A PORTABLE COMPUTER

BACKGROUND OF THE INVENTION

1. Field of the Invention

The invention relates to a display panel for a portable computer, more particularly to a display panel that has a cover and a frame which are locked at their sides.

2. Description of the Related Art

Display panel casings of portable computers are generally locked at their sides when LCDs have relatively large dimensions. Referring to FIGS. 1 and 2, a conventional display panel includes an LCD device 12, a cover 10 and a frame 14.

The LCD device 12 has opposing sides provided with a plurality of threaded holes 120. The cover 10 includes a pair of opposite left and right side end walls 15 formed with a plurality of recessed outer faces 102. Each of the recessed outer faces 102 is formed with a screw hole 100 aligned with the corresponding threaded hole 120 of the LCD device 12. Each recessed outer face 102 adjacent to a front end wall 13 has an indention 104 surrounding the screw hole 100. The frame 14 has an opening 108 for exposing a display screen (not shown) of the LCD device 12. Each side end wall 145 of the frame 14 has a flap member 142 adjacent to a front end wall 143 to project into the indention 104 of the corresponding side end wall 15. Each flap member 143 has a screw hole 140 aligned with the screw hole 100.

Two frontmost screws 16 extend through the screw holes 140 and the screw holes 100, and engage threadedly the threaded holes 120 to fix the LCD device 12 to the cover 10 and the frame 14. The remaining screws 16 engage threadedly the threaded holes 120 to fasten the LCD device 12 to the cover 10. Two screws 20 (only one is shown) engage threadedly screw holes 144 and screw holes 106 to fasten the cover 10 and the frame 14 together. A plurality of stickers 18 are attached on the recessed outer faces 102, respectively, as shown in FIG. 2.

The following are some of the drawbacks of the conventional display panel:

1. As the frontmost screws 16 extend through the screw holes 140, the screw holes 140 must be aligned with the screw holes 100. Assembly as such is inconvenient.

2. The stickers 18 used to cover the screws 16 affect adversely the appearance of the display panel.

3. The use of the stickers 18 is inconvenient since the stickers 18 must be detached during repair and must be reattached after repair.

4. The stickers 18 cannot be reused after being detached from the display panel, thereby creating a waste problem.

SUMMARY OF THE INVENTION

Therefore, the main object of the present invention is to provide a display panel that dispenses with the use of stickers to hide fastening screws which would impair the appearance of the display panel.

Another object of the invention is to provide a display panel which can be easily assembled and disassembled.

According to this invention, a display panel is adapted for use in a portable computer. The display panel includes an LCD device, a cover and a frame joined together to receive the LCD device, a plurality of first screws fastening together the cover and the frame, and a plurality of second screws fastening the LCD device to the cover.

The cover includes a first rear end wall, a first front end wall, a pair of opposite first side end walls interconnecting the first rear and first front end walls, and a plurality of first screw holes disposed adjacent to the first rear end wall to receive the first screws. Each of the first side end walls has a recessed outer face and a plurality of second screw holes that receive the second screws. The second screw holes open at and extend inwardly from the recessed outer face.

The frame includes a second rear end wall, a second front end wall, a pair of opposite second side end walls interconnecting the second rear and second front end walls, and a plurality of third screw holes disposed adjacent to the second rear end wall and aligned with the first screw holes to receive the first screws. Each of the second side end walls has a flap member projecting into the recessed outer face of a corresponding one of the first side end walls to cover the second screws.

A plurality of clasp loops project from one of the first and second front end walls to the other one of the first and second front end walls. A plurality of latches project inwardly and rearwardly from the other one of the first and second front end walls, and are inserted into the clasp loops.

BRIEF DESCRIPTION OF THE DRAWINGS

Other features and advantages of the present invention will become apparent in the following detailed description of the preferred embodiments with reference to the accompanying drawings, of which:

FIG. 6 is a perspective view showing the preferred embodiment of FIG. 3.

DETAILED DESCRIPTION OF THE PREFERRED EMBODIMENT

Figure 1:
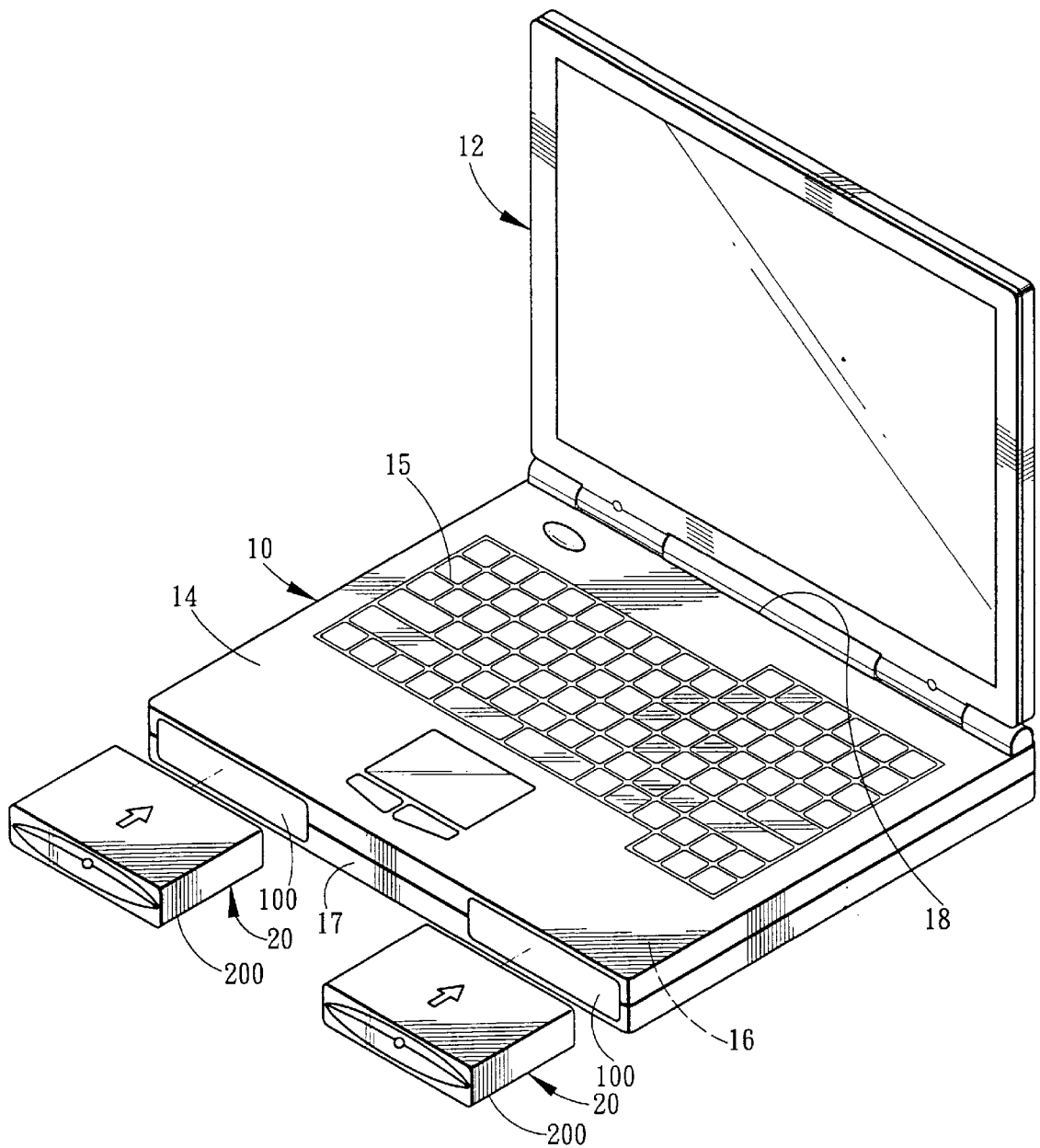
FIG. 1 is a fragmentary exploded perspective view of a conventional display panel.
Figure 2:
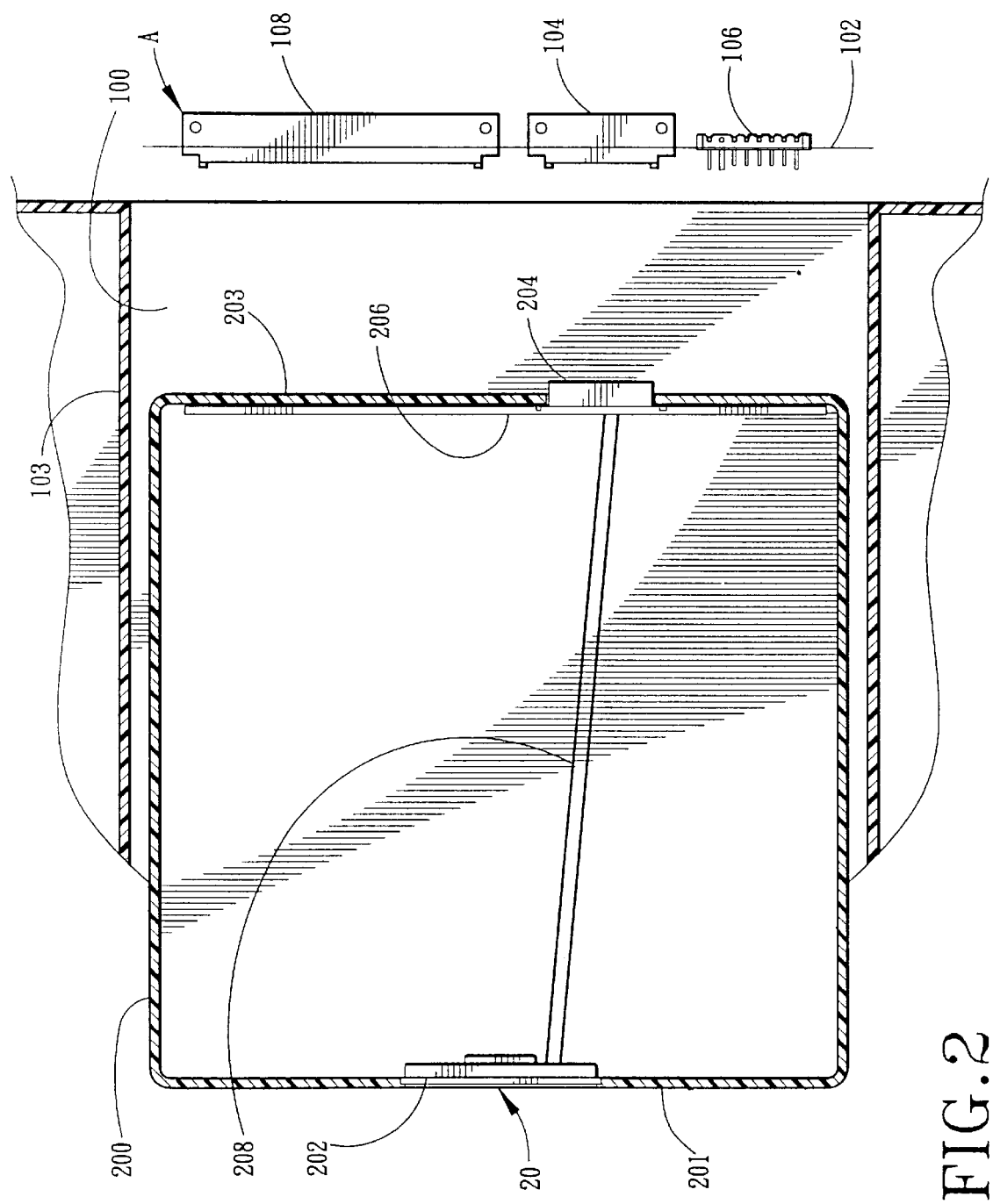
FIG. 2 is a perspective view of the conventional display panel of FIG. 1.
Figure 3:
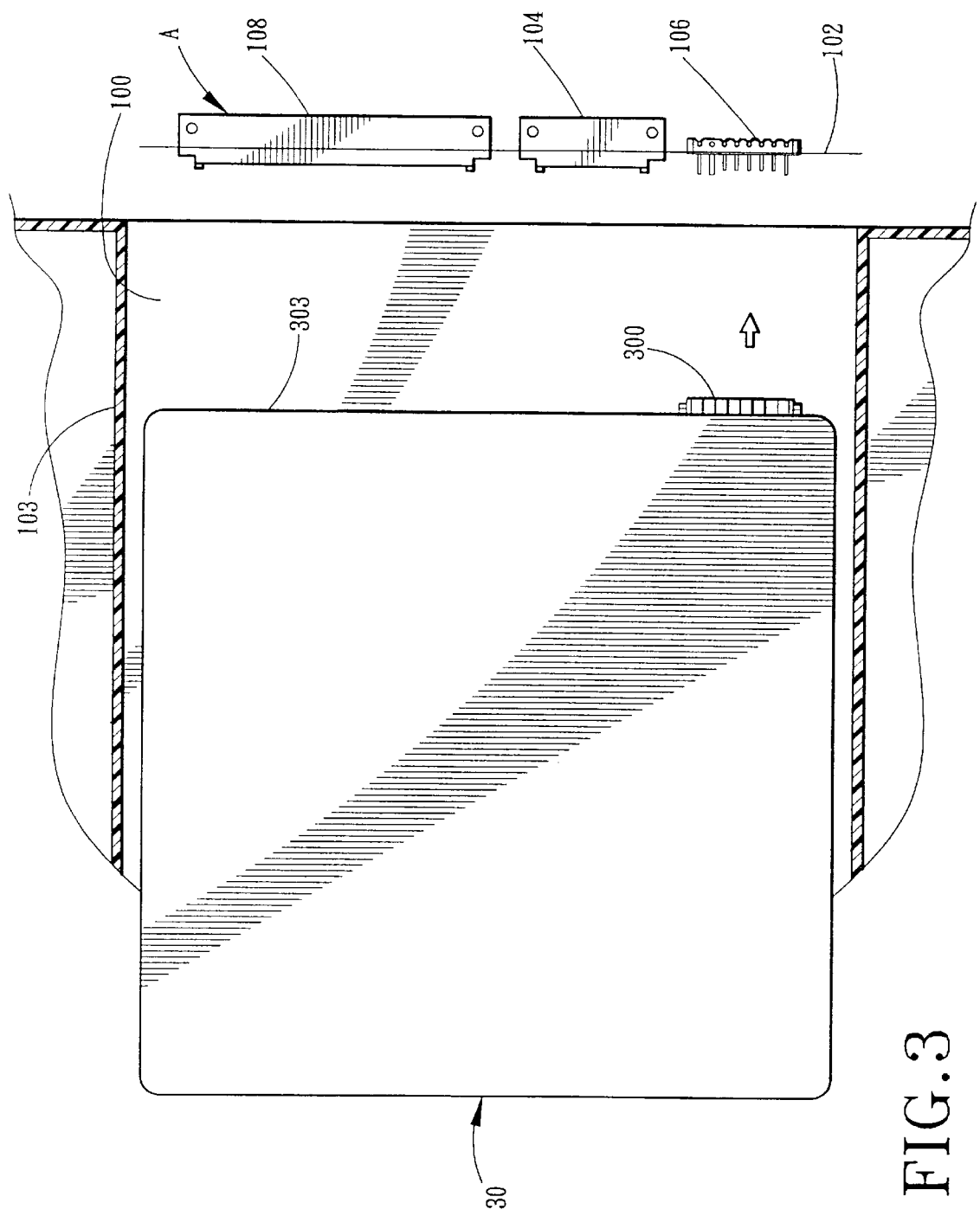
FIG. 3 is an exploded perspective view showing the preferred embodiment of a display panel according to this invention.

Referring to FIGS. 3 to 6, according to the preferred embodiment of this invention, a display panel includes an LCD device 30, a cover 40 and a frame 42 joined together to receive the LCD device 30, a plurality of first screws 60 fastening the cover 40 and the frame 42 together, and a plurality of second screw 50 fastening the LCD device 30 to the cover 40.

In this embodiment, the cover 40 includes a first rear end wall 41, a first front end wall 43, a pair of opposite first side end walls 45 interconnecting the first rear and first front end walls 41, 43, and a plurality of clasp loops 402 projecting from the first front end wall 43 toward the frame 42. The cover 40 further has a plurality of first screw holes 404 adjacent to the first rear end wall 41 to receive the first screws 60. Each of the first side end walls 45 of the cover 40 has a recessed outer face 451 formed with a plurality of second screw holes 400 that receive the second screws 50, respectively. The second screw holes 400 open at and extend inwardly from the recessed outer face 451. The second screws 50 extend through the second screw holes 400 and engage threadedly threaded holes 300 formed in the LCD device 30 and corresponding to the second screw holes 400, thereby fastening the LCD device 30 to the cover 40.

Figure 4:
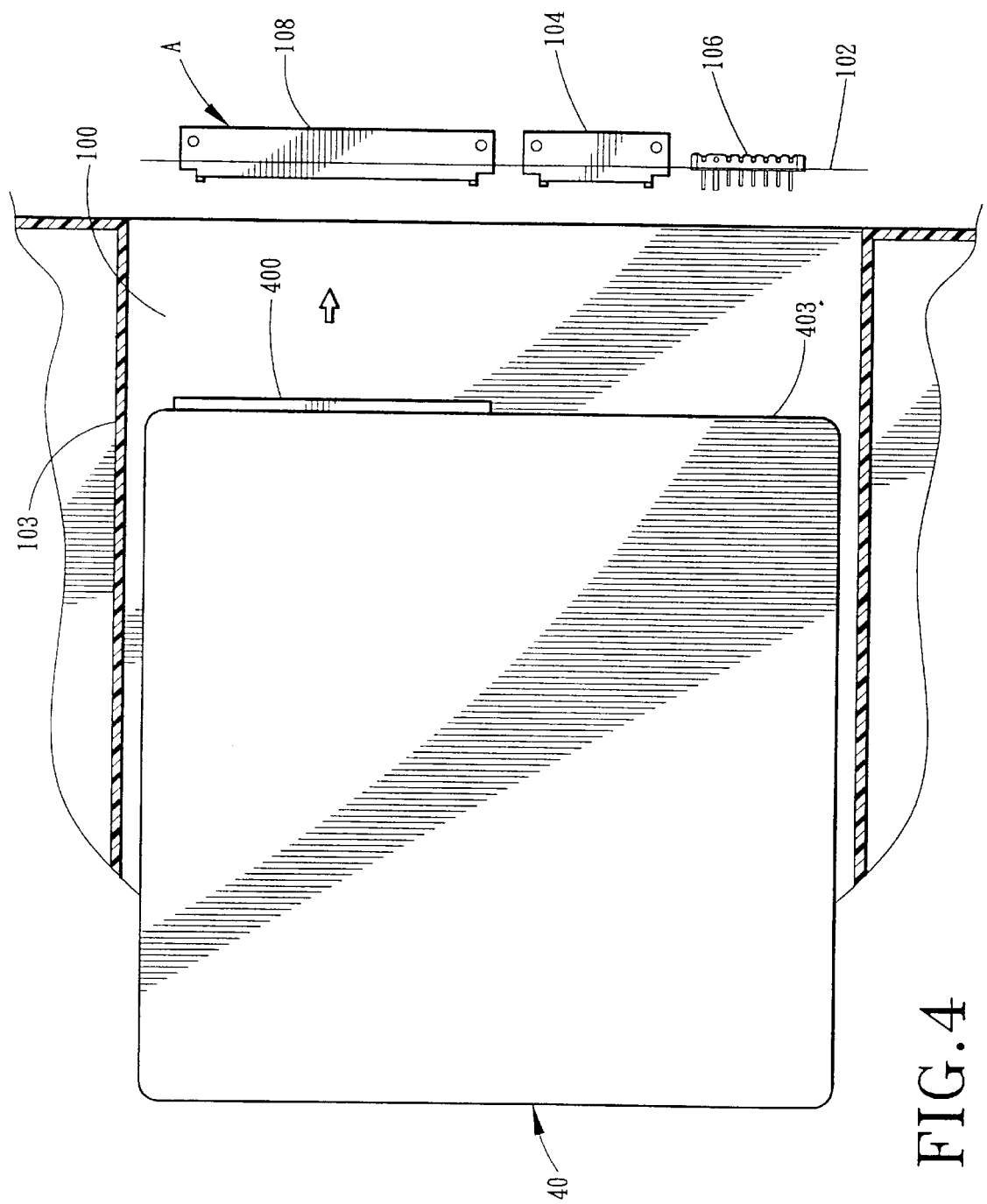
FIG. 4 is an enlarged view showing a portion of the embodiment encircled in FIG. 3.
Figure 5:
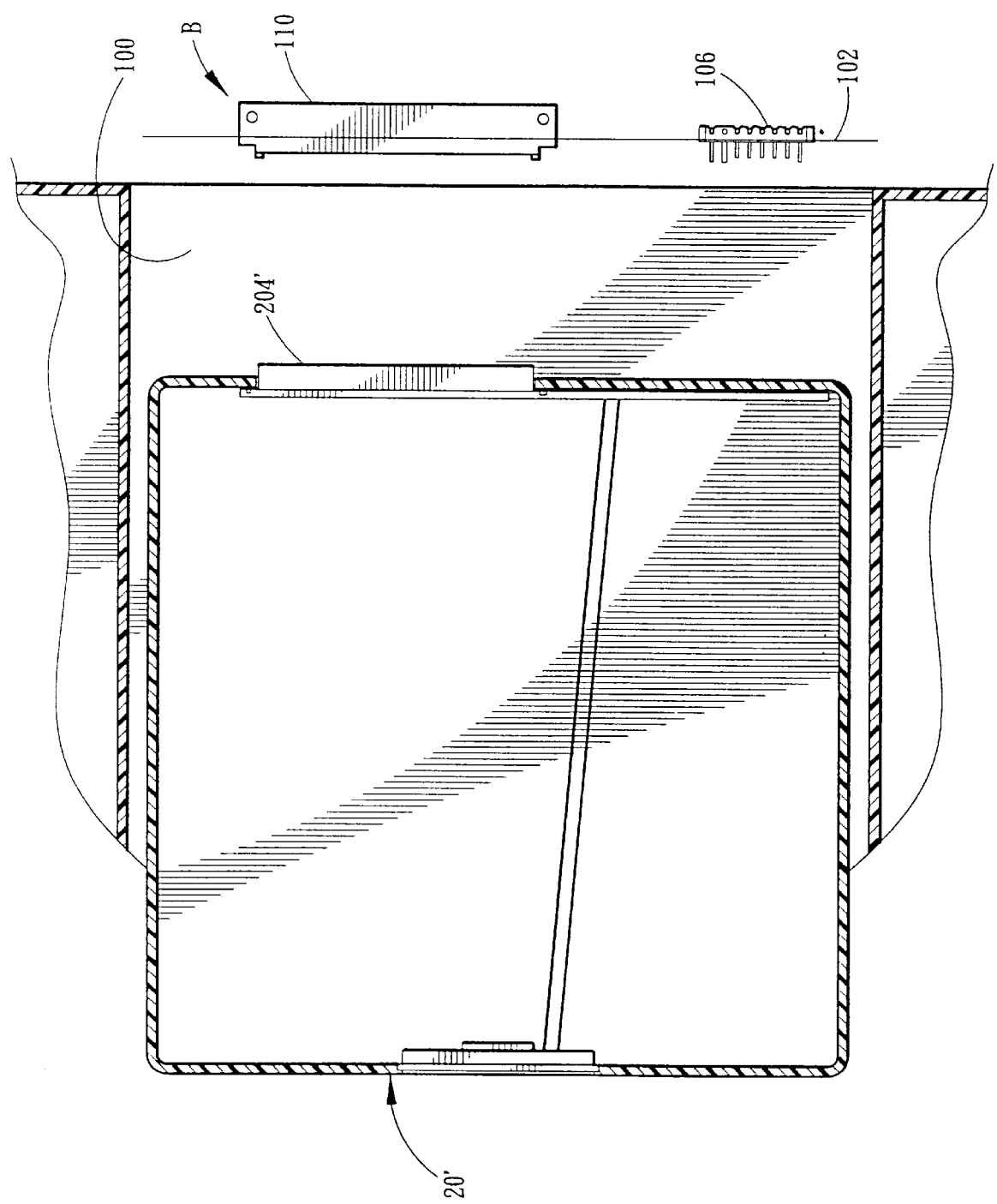
FIG. 5 is an enlarged view showing another portion of the embodiment encircled in FIG. 3.

The frame 42 has an opening 421 for exposing a display screen (not shown) of the LCD device 30, and includes a second rear end wall 44, a second front end wall 46, a pair of opposite second side end walls 48 interconnecting the second rear and second front end walls 44, 46, and a plurality of latches 422 which project inwardly and rearwardly from the second front end wall 46 and which are inserted into the clasp loops 422, respectively. Adjacent to the second rear end wall 44, the frame 42 further has a plurality of third screw holes 424 aligned with the first screw holes 404 to receive the first screws 60. Each of the second side end walls 48 of the frame 42 has a flap member 420 projecting into the recessed outer face 451 of a corresponding one of the first side end walls 45 of the cover 40 to cover the second screws 50. As shown in FIG. 4, preferably, the lower cover 42 has the flap members 420 for covering the second screws 50. As such, the display panel has a neat construction that can facilitate assembly of the display panel or repair of the LCD device 30.

Each second side end wall 48 has only one flap member 420 that is lengthened towards the second front and second rear end walls 46, 44 so as to cover all of the second screws 60 attached to the corresponding first side end wall 45 when the cover 40 is connected to the frame 42. The provision of the flap members 420 eliminates the need to use the stickers taught in the conventional display panel.

In assembly, the cover 40 is connected to the LCD device 30 by means of the first screws 50 and the screw holes 300 and 400. The cover 40 is then assembled on the frame 42 by engaging the clasp loops 402 with the latches 422 and by inserting threadedly the screws 60 into the first and third screw holes 404 and 424 of the cover 40 and the frame 42. Assembly of the cover 40 and the frame 42 is thus facilitated since the second side end walls 48 of the frame 42 need not be screwed to the first side end walls 45 of the cover 40.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A display panel for a portable computer, comprising:

an LCD device, a cover and a frame joined together to receive said LCD device, a plurality of first screws fastening together said cover and said frame, and a plurality of second screws fastening said LCD device to said cover;

said cover including a first rear end wall, a first front end wall, a pair of opposite first side end walls interconnecting said first rear and first front end walls, and a plurality of first screw holes disposed adjacent to said first rear end wall to receive said first screws, each of said first side end walls having a recessed outer face, and a plurality of second screw holes that receive said second screws, respectively, said second screw holes opening at and extending inwardly from said recessed outer face;

said frame including a second rear end wall, a second front end wall, a pair of opposite second side end walls interconnecting said second rear and second front end walls, and a plurality of third screw holes disposed adjacent to said second rear end wall and aligned with said first screw holes to receive said first screws, each of said second side end walls having a flap member projecting into said recessed outer face of a corresponding one of said first side end walls to cover said second screws;

a plurality of clasp loops projecting from one of said first and second front end walls to the other one of said first and second front end walls; and a plurality of latches which project inwardly and rearwardly from said other one of said first and second second front end walls and which are inserted into said clasp loops.

2. The display panel as claimed in claim 1, wherein said clasp loops are disposed on said first front end wall, and said latches are disposed on said second front end wall.

3. The display panel as claimed in claim 1, wherein said flap member is single and is lengthened towards said second front and second rear end walls to cover all of said second screws received in said second screw holes disposed in the corresponding one of said first side end walls.

* * * * *